Nov. 23, 1965    S. A. VAN PELT    3,219,375

RECORD HANDLING DEVICE

Filed Oct. 24, 1962

INVENTOR.
SEAB A. VANPELT
BY Harold D. Jones
ATTORNEY

United States Patent Office 3,219,375
Patented Nov. 23, 1965

3,219,375
RECORD HANDLING DEVICE
Seab A. Van Pelt, 1621 Beacon Hill Blvd. NE., Atlanta, Ga.
Filed Oct. 24, 1962, Ser. No. 232,780
4 Claims. (Cl. 294—16)

This invention relates to devices for handling phonograph records, and more particularly to a device for conveniently moving phonograph records between their places of storage and the apparatus used to play them without damaging the playing surfaces of the phonograph records.

The playing surfaces of phonograph records have always been easy to damage. This is particularly true of modern high quality records whose playing qualities are distorted by the slightest playing surface blemish or imperfection. Accordingly, it has become customary for record owners to store high quality phonograph records in one or more dust jackets or envelopes and to avoid touching the playing surfaces with the hands or any object when actually handling the phonograph records.

However, it is difficult to remove a phonograph record from a dust jacket without touching its playing surface since its non-playing edge is generally so narrow that it provides little surface for gripping with the fingers or a device of some type. For the same reason, it is difficult to handle a phonograph record after it has been removed from its jacket and to place it in position on a playing apparatus. It is also difficult for the same reason to remove the phonograph record from the playing apparatus and return it to its dust jacket.

These difficulties can not be avoided by using the non-playing label portion of the phonograph record for handling. Except for very small phonograph records, the fingers are not long enough to reach the label portion conveniently if at all. Moreover, it is difficult to grip a phonograph record in the label portion when it is in a dust jacket and practically impossible to do so when the phonograph record is on a playing apparatus. A tong-like device for gripping the label portion would aid in removing a phonograph record from a dust cover, but would be no better than the fingers for removing the record from a playing apparatus. In addition, the use of such a device to grip the label portion of a phonograph record would introduce the risk of the device damaging the playing surface of the phonograph record if the phonograph record slipped between the jaws of the device.

The new and improved device described herein completely eliminates these difficulties in handling phonograph records. This is because it is easily insertable into the dust jacket of a phonograph record where it will firmly grip the phonograph record by its non-playing edge, but without exerting pressure which might crack or chip the non-playing edge. Once the phonograph record has been gripped by the device, it may be easily removed from the dust jacket and transported in a controlled attitude to a playing apparatus or other location. The record may be placed on the playing apparatus in a horizontal or vertical attitude depending upon the type of playing apparatus used.

When it is desired to remove a phonograph record from the playing apparatus, the device permits the phonograph record to be firmly gripped even though there are one or more phonograph records stacked beneath it and even though the phonograph record may be in a deep well or box like compartment. Having been removed from the playing apparatus, the phonograph record can be easily returned to a dust jacket using the device.

These improvements are accomplished by a device having two arms which curve in opposite directions from a handle portion to form a semi-circle with a diameter slightly greater than that of a long playing phonograph record. A record gripper with a channel adapted to fit the non-playing edge of a phonograph record extends from and is pivotably attached to the end of each arm. On each arm between the handle and the record gripper is positioned a stop which checks the motion of a phonograph record as the phonograph record and the record grippers tend to pivot, but which permits such motion when it is desired.

These and other features of the invention will be more clearly understood from the following detailed description and the accompanying drawings in which like characters designate corresponding parts in all figures and in which.

Figures 1, 3, 4:
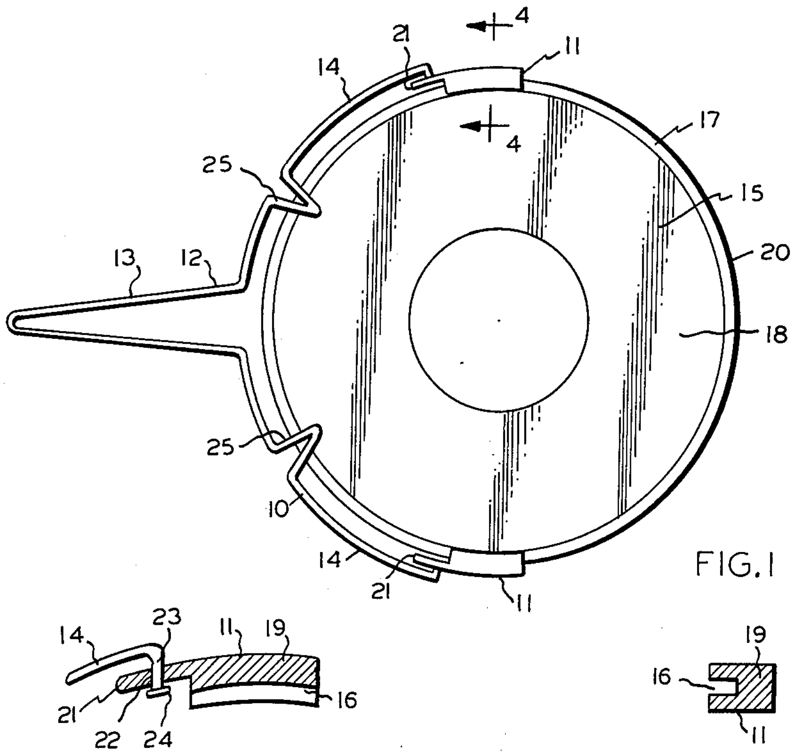
FIGURE 1 is a plan view of the record handling device and of a phonograph record and shows the phonograph record being held in a horizontal attitude.
FIGURE 3 is a detailed view of the remote end of an arm of the record handling device with the record gripper in section in the plane of a phonograph record in order to show the channel contour and the manner in which the record gripper is pivotably attached to the arm.
FIGURE 4 is a section view of the record gripper taken in line 4—4 in FIGURE 1 and shows the channel in the record gripper.
Figure 2:
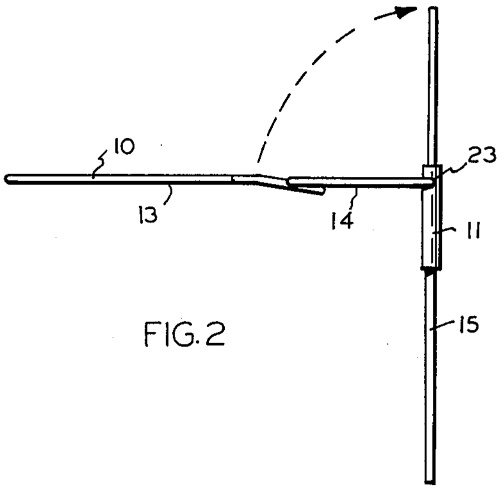
FIGURE 2 is side elevation view of the record handling device and of a phonograph record and shows the record handling device after it has been turned into a position which permits the phonograph record to pivot into a vertical attitude.

These figures and the following detailed description disclose a preferred specific embodiment of the invention but the invention is not limited to the details disclosed since it may be embodied in other equivalent forms.

The record handling device 10 is comprised of two record grippers 11 and a handle and arm unit 12. Preferably, the handle and arm unit 12 is formed from a single piece of wire-like material and consists of a V-shaped handle 13 with an arm 14 extending from the end of each leg of the V. The handle 13 and the arms 14 are in the same plane and the arms 14 are of equal length and extend as arcs in opposite directions from the handle 13 so that together they form the arc of a circle having a diameter slightly greater than the diameter of a phonograph record 15 such as a long playing phonograph record.

Each record gripper 11 is an elongated box-like structure having a channel extending from end to end along one side. The channel 16 in each record gripper 11 corresponds generally in shape to a portion of the non-playing edge 17 of a phonograph record 15. However, the width of the channel 16 is sufficiently greater than the thickness of the non-playing edge 17 to permit the easy insertion of the non-playing edge 17 into the channel 16. Moreover, the depth of the channel 16 is sufficiently less than the width of the non-playing edge 17 to insure that when the non-playing edge 17 is inserted into channel 16, the record gripper 11 will engage only the non-playing edge 17 and not the playing surface 18 of a phonograph record 15.

Each record gripper 11 has a solid portion 19 which is beyond the outer most edge 20 of a phonograph record 15 when the non-playing edge 17 of the phonograph record 15 is inserted in the channel 16 of a record gripper 11. To one end of this solid portion 19 is attached a tab 21 which extends along a circle having a diameter greater than the diameter of a phonograph record 15. Thus, the tab 21 will not obstruct the insertion of the non-playing edge 17 of a phonograph record 15 into the channel 16 of a record gripper 11. Each tab 21 has a hole 22 extending through it and the two record grippers 11 are attached to the arms 14 by inserting a hook 23 formed at the end of each arm 14 through the hole 22 and by subsequently flaring the end 24 of the hook 23 so that the hook 23 will not slide out of the hole 22.

The hooks 23 extend toward each other along a line joining them and the holes 22 are positioned in the tabs 21 so that when hooks 23 are inserted, the channels 16 can be made to face each other along the circumference of the same circle. Thus the channels 16 are both within the extension of the arc of a circle formed by the arms 14 and a phonograph record 15 with its non-playing edge 17 inserted into both channels 16 will be held on opposite sides between the record grippers 11 and within the arc formed by the arms 14.

The lengths of the arms 14 and the channels 16 are such that a phonograph record 15 can be inserted between the record grippers 11 with a line joining the mid-lengths of the channels 16 passing through the center of the phonograph record 15 and with the arc formed by the arms 14 having its center of curvature generally corresponding with the center of the phonograph record 15. This permits the record handling device 10 to firmly grip a phonograph record 15 by its non-playing edge 17.

Moreover, when gripping a phonograph record 15 between the record grippers 11, the width of the record handling device 10 exceeds the diameter of the phonograph record 15 only by the thickness of the solid portions 19 of the record grippers 11. This is because only the record grippers 11 are intersected by a diameter of the phonograph record 15. Since the solid portions 19 of the record grippers 11 may be made with minimum thickness, the record handling device 10 will not only firmly grip a phonograph record 15 between the record grippers 11, but can be easily inserted into a dust jacket with record grippers 11 on both sides of the phonograph record 15 so as to grip and remove the phonograph record 15 from the dust jacket. The width of the dust jacket need exceed the diameter of the phonograph record 15 only by an amount equal to the thickness of the solid portions 19 of the record grippers 11.

The firm gripping of a phonograph record 15 between record grippers 11 is insured by selecting a resilient material for the handle and arm unit 12 and by forming the unit 12 so that the legs of the V of the handle 13 and the arms 14 are initially closer together than when a phonograph record 15 is between the record grippers 11. Thus, the gripping of a phonograph record 15 by the record grippers 11 forces the V of the handle 13 and the arms 14 apart and the resiliency of the material selected for the handle and arm unit 12 holds the record grippers 11 against the outermost edge 20 of the phonograph record 15. The firm gripping of a phonograph record 15 is further insured by the fact that the manual squeezing of the V of the handle 13 will force the record grippers 11 toward each other.

Since only the record grippers 11 are intersected by a diameter of a phonograph record being held by the record handling device 10 and since a line joining the hooks 23 is between the handle 13 and a diameter of the phonograph record 15 extending between the record grippers 11, record grippers 11 and a phonograph record 15 being held by them will tend to rotate about the hooks 23 because the weight of the phonograph record 15 and the record grippers 11 on the other side of this line. This tendency of the phonograph record 15 to rotate is checked by placing a stop 25 on each arm 14 between the handle 13 and the hook 23.

Preferably, the stops 25 are simply loops in the wire-like material of the arms 14 which extend away from the plane of the arms but toward the center of a phonograph record 15 being held by the record handling device 10. This orientation of the stops 25 insures that they will be engaged by the outermost edge 20 of a phonograph record 15 rotating toward them but will not engage the playing surface 18 of the phonograph record 15.

Both stops 25 will be on the same side of a phonograph record 15 being gripped by the record handling device 10 and this insures that the phonograph record 15 will remain in the plane of the arms 14 as it is transported by the record handling device 10. However, if, after gripping the phonograph record 15, the record handling device 10 is turned over, the phonograph record 15 will tend to rotate away rather than toward the stops 25. As a result the phonograph record 15 and record grippers 11 will rotate until the record is in a vertical position. Thus, after a phonograph record 15 is removed from a dust jacket, the phonograph record 15 may be transported and placed on a playing apparatus in either a horizontal or vertical position depending upon whether the record handling device is or is not turned over. There are many types of playing apparatus such as those with deep wells for which the vertical positioning of a phonograph record 15 is highly desirable.

The release of a phonograph record 15 from the record handling device 10 can be easily achieved by simply forcing the fingers down into the V of the handle 13. This will force the legs of the V, the arms 14, and the record grippers 11 apart to the extent necessary to release the phonograph record 15. This same manual spreading of the legs of the handle 13 and of the record grippers 11 can also be used to grip a phonograph record 15 where the sliding of the record grippers 11 along the outermost edge 20 of a phonograph record 15 as in a dust jacket is not convenient. This will most frequently occur when removing a phonograph record 15 from playing apparatus and is a convenient way of removing a phonograph record 15 from a playing apparatus regardless of the number of phonograph records 15 in a stack. Once the phonograph record 15 has been gripped and removed from the playing apparatus, it may be transported and returned to a dust jacket while held in either a horizontal or vertical position in the same manner as it was originally removed from the dust jacket.

What is claimed as invention is:

1. A device for handling a phonograph record having a non-playing circular edge comprising in combination, a handle of wire-like material formed in the shape of a V; two arms of wire-like material, the first arm being joined to one leg of the V of the handle and the second arm being joined to the other leg of the V of the handle, and both arms being in the same plane as the V of the handle and together forming an arc with a radius slightly greater than the radius of the phonograph record; two hooks extending toward each other, the first hook being at that end of the first arm remote from the handle and the second hook being at that end of the second arm remote from the handle, and said two hooks being joinable by a line joining their extending ends and passing between the handle and the center of curvature of the arc formed by the two arms; two record grippers with a tab at one end of each, the first record gripper being rotatably attached by its tab to the first hook and the second record gripper being rotatably attached by its tab to the second hook, each record gripper having a channel with a contour similar to that of the non-playing edge of the phonograph record and which extends from that end having the tab to the opposite end along that side nearest the other record gripper, and said two record grippers being joinable by a line extending between channels and through the center of curvature of the arc formed by the arms; and two stops, the first stop being positioned along the first arm between the handle and the end of the arm remote from the handle and second stop being positioned along the second arm between the handle and the end of the arm remote from the handle, and both stops extending above the plane of the arms and in the direction of the center of curvature of the arc formed by the arms.

2. A device for handling a phonograph record comprising a handle of wire-like material, a first arm joined integrally with the handle, a second arm joined integrally with the handle, both arms being in the same plane as the handle and together forming an arc with a radius slightly greater than the radius of a phonograph record; two hooks extending toward each other, the first hook being at that end of the first arm remote from the handle, the second hook being at that end of the second arm remote from the handle; and two record grippers with a tab at one end of each, the first record gripper being freely rotatably attached by its tab to the first hook, the second record gripper being freely rotatably attached by its tab to the second hook, each record gripper having a channel with a contour similar to that of the edge of a phonograph record.

3. A device for handling a phonograph record comprising a handle of wire-like material formed in the shape of a V; two arms of wire-like material, the first arm being formed as an extension of one leg of the V of the handle and the second arm being formed as an extension of the other leg of the V of the handle, both arms being in the same plane and forming an arc; and two record grippers, the first record gripper being freely rotatably attached at one end to that end of the first arm remote from the handle, the second record gripper being freely rotatably attached at one end to that end of the second arm remote from the handle, each record gripper having a channel which has a contour similar to the edge of a phonograph record.

4. A device for handling a phonograph record comprising an arc of wire-like material; two elongated record grippers, the first record gripper being freely rotatably attached to one end of the arc, the second gripper being freely rotatably attached to the other end of the arc, each record gripper having a channel which faces that of the other record gripper with a contour similar to that of the edge of a phonograph record.

References Cited by the Examiner

UNITED STATES PATENTS

| | | | |
|---|---|---|---|
| 1,862,625 | 6/1932 | Kerr | 294—99 |
| 3,044,097 | 7/1962 | Proschold | 294—6 |

FOREIGN PATENTS

| | | |
|---|---|---|
| 289,362 | 4/1928 | Great Britain. |

ROBERT B. REEVES, *Primary Examiner.*

ANDRES H. NIELSEN, SAMUEL F. COLEMAN, *Examiners.*